(No Model.)  5 Sheets—Sheet 1.
H. CLAY.
PNEUMATIC DISPATCH OR TRANSIT SYSTEM.
No. 489,932.  Patented Jan. 17, 1893.
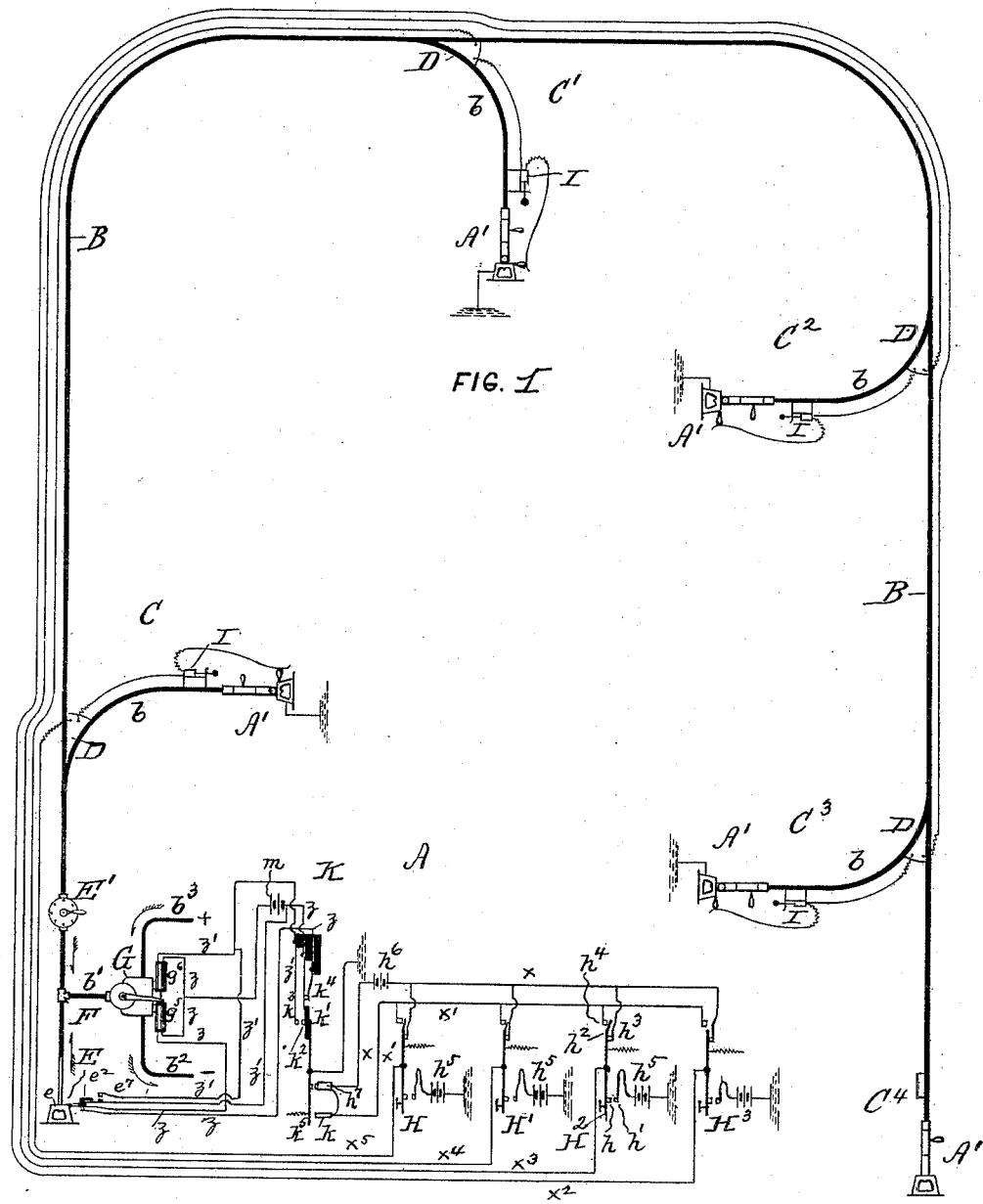
FIG. I.
WITNESSES:
INVENTOR
Henry Clay
BY
Van Stavorn
ATTORNEY (No Model.) 5 Sheets—Sheet 2.
H. CLAY.
PNEUMATIC DISPATCH OR TRANSIT SYSTEM.
No. 489,932. Patented Jan. 17, 1893.
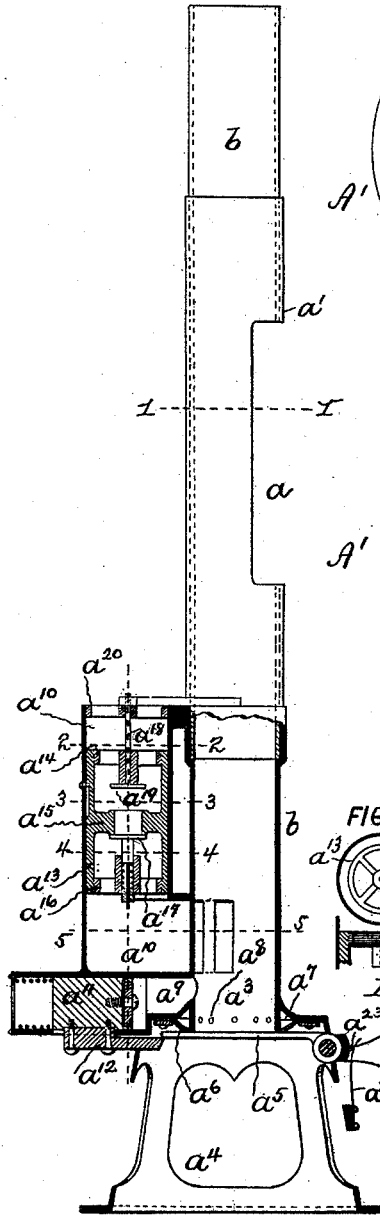
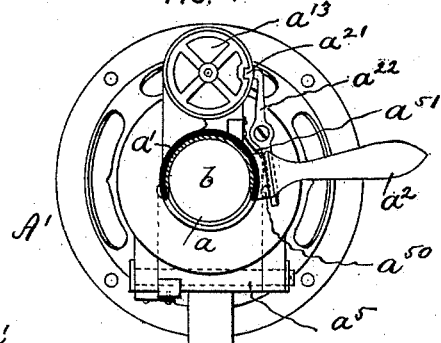
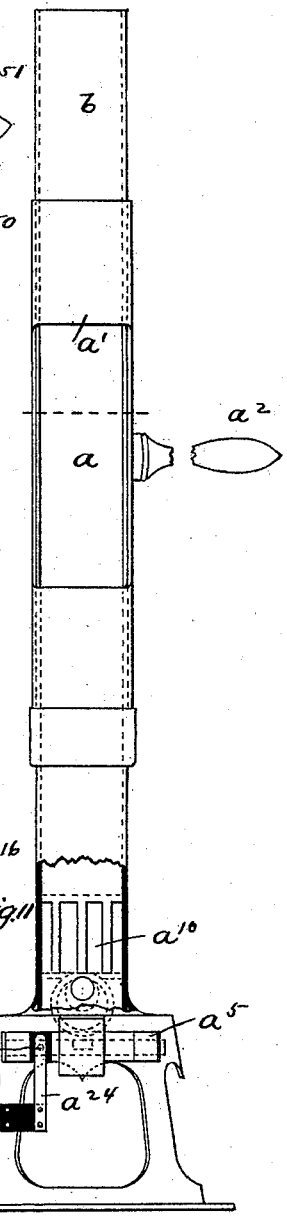
WITNESSES:
INVENTOR
Henry Clay
BY
O. J. Van Stavoren
ATTORNEY

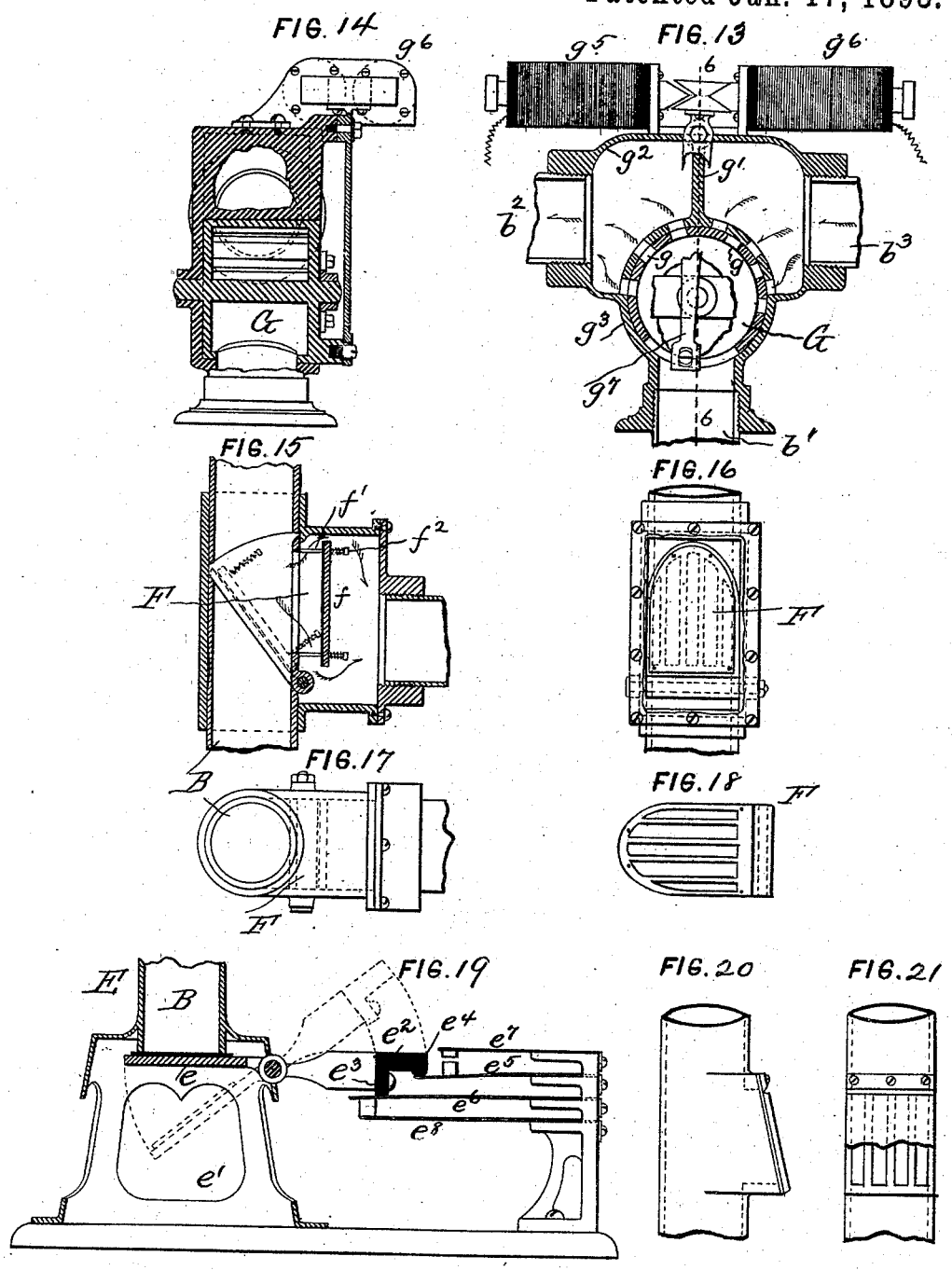

(No Model.) 5 Sheets—Sheet 4.
H. CLAY.
PNEUMATIC DISPATCH OR TRANSIT SYSTEM.
No. 489,932. Patented Jan. 17, 1893.
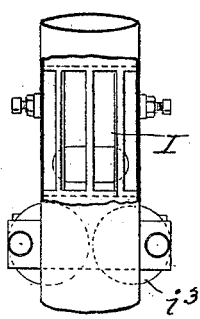
FIG. 23
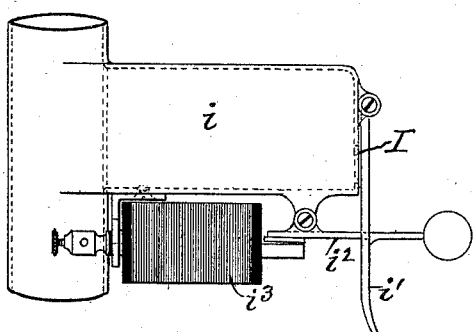
FIG. 22
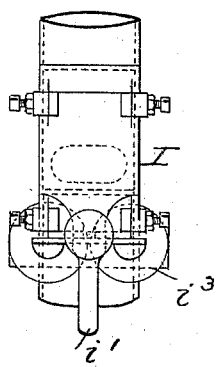
FIG. 24
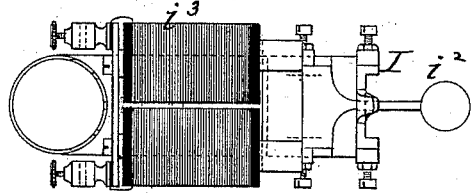
FIG. 25
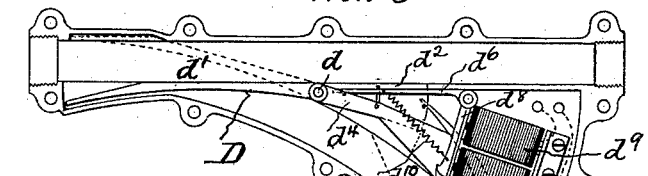
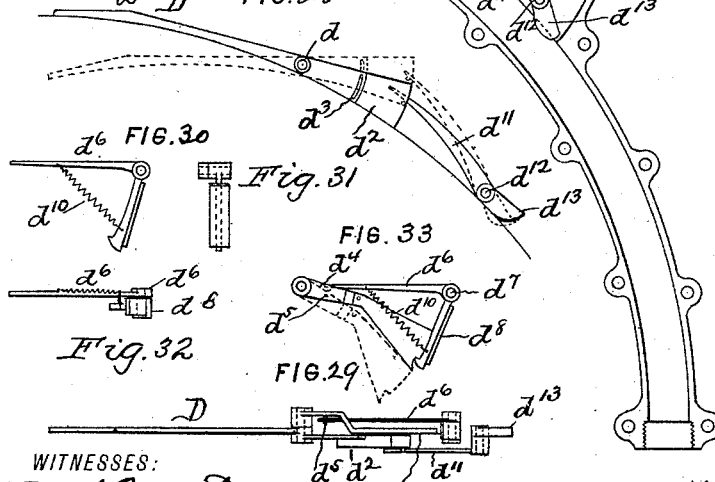
FIG. 26 FIG. 27
FIG. 28
FIG. 30 Fig. 31
FIG. 33
Fig. 32 FIG. 29
WITNESSES:
Geo. F. Byington
L. R. Miller
INVENTOR
Henry Clay
BY S. J. VanHavorn
ATTORNEY (No Model.)

5 Sheets—Sheet 5.

H. CLAY.
PNEUMATIC DISPATCH OR TRANSIT SYSTEM.

No. 489,932.

Patented Jan. 17, 1893.

WITNESSES:

INVENTOR
Henry Clay
BY Van Stavorn
ATTORNEY

UNITED STATES PATENT OFFICE.

HENRY CLAY, OF PHILADELPHIA, PENNSYLVANIA, ASSIGNOR TO THE ELECTRIC PNEUMATIC TRANSIT COMPANY, OF SAME PLACE.

PNEUMATIC DISPATCH OR TRANSIT SYSTEM.

SPECIFICATION forming part of Letters Patent No. 489,932, dated January 17, 1893.

Application filed October 26, 1889. Serial No. 328,360. (No model.)

*To all whom it may concern:*

Be it known that I, HENRY CLAY, a citizen of the United States, residing at Philadelphia, in the county of Philadelphia and State of Pennsylvania, have invented certain new and useful Improvements in Pneumatic Dispatch or Transit Systems, of which the following is a specification.

My invention has relation to pneumatic dispatch tube systems having sub-lines leading out from a central station and the sub-lines having subscribers' stations; and it has for its object the transmission of carriers from the central station to any of the sub-line stations and from the latter to the former through a single tube and controlled from the central office so that no manipulation of parts of the system at the subscriber's station by the subscriber is required to transmit or send a carrier except to place the carrier in the tube when sending it.

Reference is had to the accompanying drawings wherein

Figure 35:
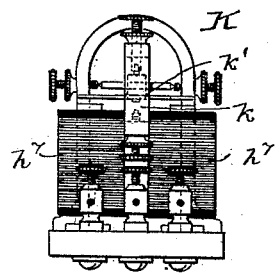
Figure 34:
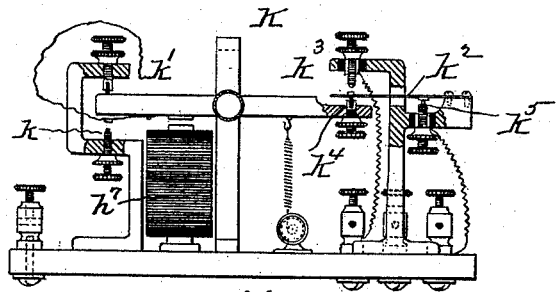
Figure 36:
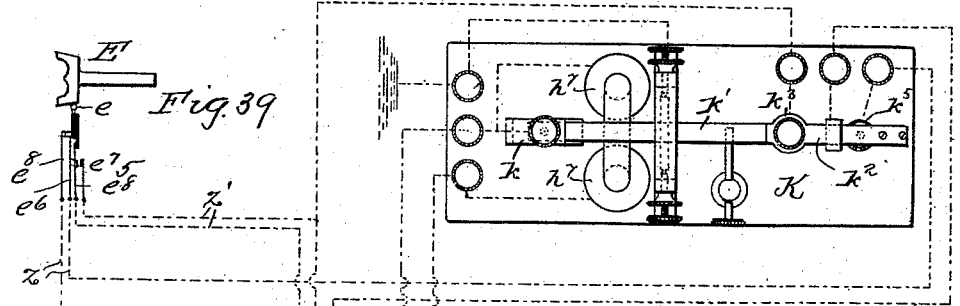
Figure 37:
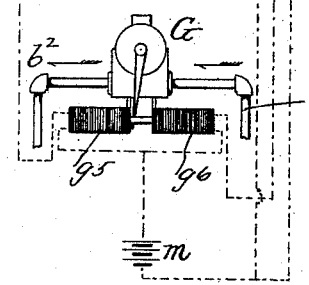
Figure 38:
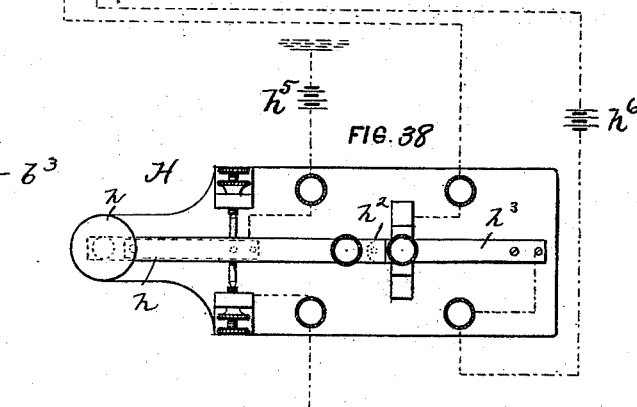
Figure 41:
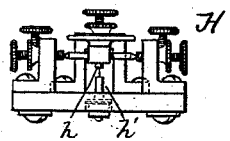
Figure 40:
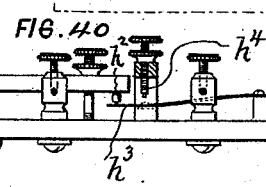

Figure 1 is a diagrammatic view of a sub-line with subscribers' stations and central office appliances embodying my invention the pumping or like devices for the tubes at the central office not being shown; Fig. 2, is an elevation, partly sectional, of the carrier receiving and transmitting device for the subscribers' stations; Fig. 3, is a like view from another point of view; Fig. 4; is a plan, partly sectional on the line 1—1 Fig. 2; Fig. 5, is a sectional elevation of the air controlling valve shown in Fig. 2 and is indicated in its closed position; Fig. 6, is a section on the line 2—2 Fig. 2; Fig. 7, is a sectional elevation of Fig. 6; Fig. 8, is a section on the line 3—3 Fig. 2; Fig. 9, is a section of Fig. 8; Fig. 10 is a section on the line 4—4 Fig. 2; Fig. 11, is a sectional elevation of Fig. 10; Fig. 12, is a section on the line 5—5 Fig. 2; Fig. 13, is a sectional elevation of the current or pressure controlling valve at the central station for reversing the direction of the air flow or pressure in the sub-lines; Fig. 14, is a section on the line 6—6 Fig. 13; Fig. 15, is a section of the valve at the junction of the sub-line and the tube or pipe leading from said current or pressure reversing valve; Fig. 16, is an elevation of the same; Fig. 17, is a plan of the same; Fig. 18, is a view of part of said valve detached; Fig. 19, is a sectional elevation of the lower part of the central office carrier receiver; Figs. 20 and 21, show elevations from different points of view and the latter figure partly broken away of a safety valve for the sub-line system; Fig. 22, is an elevation of the escape valve or air vent at the subscribers' stations; Fig. 23, is an elevation of the same partly broken away; Fig. 24, is an elevation of the same from another point of view; Fig. 25, is a plan of the same; Fig. 26, is a plan view of the carrier diverting switches for the system; Fig. 27, is an edge view of the coupling boxes or casings for said switches; Fig. 28, is a plan view of part of said switch detached from the coupling box; Fig. 29, is an edge view of all the parts of the switch; Figs. 30, 31, and 32 are respectively an elevation, a plan and an edge view of the armature lever for said switch; Fig. 33 shows an elevation of said armature lever and the tail piece for the switch; Fig. 34, is an elevation of the electrical key at the central office or station controlling the air or current reversing valve at said station and the carrier diverting switches and electrical devices at the sub-stations; Fig. 35, is an end view of the same; Fig. 36 is a plan of the same, Fig. 37, is a plan of the air or current reversing valve; Fig. 38, is a plan of the operator's electrical key at the central station, and Fig. 39, a plan of part of the carrier receiver at the central station, and all of said Figs. 36, 37, 38, and 39, being shown in electrical connection with each other as indicated by dotted lines for the purpose of more plainly exhibiting such connections; Fig. 40, is a side elevation of Fig. 38; and Fig. 41, is an end view of the same.

A in Fig. 1 represents the central office station, B the sub-line leading out of said station and having branches *b* for the subscribers' stations of which in the drawings four branch subscribers' stations are shown and one other subscriber's station is shown at the end of the line B which last named station does not need to be in a branch from the line B as it is the terminal of said line. Said subscribers' stations are respectively lettered C, C', C², C³, C⁴, and are provided with combined carrier receiving and transmitting devices A' which form part of the tube of the system. At the junction of the sub-line and its branches $b$ are located carrier diverting switches D.

At the end of tube B at the central station is the carrier receiving device E for that station and beyond said receiver is a carrier transmitting device E' and between said transmitting and receiver devices and at the junction of tube B and another tube $b'$ is a valve F which cuts off the air pressure or force from the central office station receiver after a carrier has been received and directs such pressure or force into the sub-line B as and for a purpose hereinafter explained. In tube $b'$ is located the air or pressure reversing valve G having pipes $b^2$ and $b^3$ leading respectively to the suction and pressure sides of a pump or other suitable device for creating a suction and a pressure or two separate currents of air in opposite directions as fully described and claimed in another pending application, of same date herewith and Serial No. 328,359, said pump or like devices not being shown as they are well known and do not in themselves form any part of this invention.

H, H', H², and H³ are the operator's electrical keys at the central office for controlling the transmission of carriers from the central station to the subscribers' stations; there being one of said keys for each said stations except the last or terminal station C⁴.

As the operation of sending and receiving the carriers either at the central or subscriber's station will be more easily understood by first describing all the parts of the system and their operation separately I shall proceed to do so and will then describe the general operations of the system.

The combined carrier receiving and transmitting device A' for the subscribers' stations is more plainly shown in Figs. 2 to 12 inclusive and it comprises a fixed sleeve or tube which is in practice the end of branch pipe $b$ having an elongated side opening $a$ which is opened and closed so that a carrier can be inserted into pipe $b$, by a sleeve $a'$ on pipe $b$ which sleeve has a corresponding side opening for registration with opening in pipe $b$. The sleeve $a'$ has an operating handle $a^2$ by means of which said sleeve is moved to open or close the opening in pipe $b$ when inserting the carrier into it. The lower end $a^3$ of pipe $b$ is preferably provided with a skeleton box $a^4$ to which is pivoted a plate or valve $a^5$ for normally closing the end $a^3$ of said pipe $b$ and if desired between said plate $a^5$ and the edge of the end $a^3$ of pipe $b$ may be inserted an elastic or other suitable gasket $a^6$ secured in any suitable way to box $a^4$ in such manner that an annular space $a^7$ is formed around the end $a^3$ of pipe $b$ which space is in communication with said pipe $b$ by way of perforations $a^8$ near the end of said pipe. This described construction of gasket $a^6$ is used to more effectually seal the end $a^3$ of pipe $b$ when used in conjunction with the plate $a^6$ when it is in its normal or closed position as shown in Fig. 2. To one side of the end $a^3$ of pipe $b$ are secured or formed a lower chamber $a^9$ and a vertical upper chamber $a^{10}$ which communicate with pipe $b$ as shown or in any other suitable manner. In chamber $a^9$ is located a sliding piston $a^{11}$ having an arm $a^{12}$ projecting through an elongated slot in the wall of chamber $a^9$ which arm forms a bar for locking plate $a^5$ in its closed or normal position and which must be released before said plate $a^5$ can drop or open. In the upper chamber $a^{10}$ is a tubular slide $a^{13}$ having an upper skeleton head $a^{14}$, a middle partition $a^{15}$ with central opening and a lower skeleton head $a^{16}$. In the central opening of the lower head $a^{16}$ is a spring supported valve $a^{17}$ which closes upwardly against the lower side of the partition $a^{15}$. In the central opening of the upper head $a^{14}$ is a rod $a^{18}$ having at its lower end a valve $a^{19}$ which closes against the upper side of partition $a^{15}$ and said rod at its upper end is secured to the skeleton head $a^{20}$ at the top of chamber $a^{10}$. The upper part of chamber $a^{10}$ is always open to the atmosphere by way of its skeleton head $a^{20}$ and when both valves $a^{17}$ $a^{19}$ are open the pipe $b$ is in communication with the atmosphere by way of the tubular slide $a^{13}$. The upper part of said slide $a^{13}$ is provided with a catch $a^{21}$ for engagement with a pivoted pawl $a^{22}$ under the control of the sleeve $a'$ for holding the slide $a^{13}$ in its raised or normal position as shown in Fig. 5. in which position both valves $a^{17}$ $a^{19}$ are closed and only the upper part of chamber $a^{10}$ is then in communication with the atmosphere so as to shut off the combined receiver and transmitter to the atmosphere by way of chamber $a^{10}$ and slide $a^{13}$. In this position carriers are received from the central station at the sub-stations, or in opening the sleeve $a'$ to insert a carrier into tube $b$ the act of opening said sleeve $a'$ causes a pin $a^{50}$ on sleeve handle $a^2$ to strike against the tail-piece of pawl $a^{22}$ to release catch $a^{21}$ on slide $a^{13}$ which then drops and its valves open to put the pipe $b$ into communication with the atmosphere to admit of the suction in pipe $b$ propelling the inserted carrier from the pipe $b$ into and through the pipe or tube B to the central station as hereinafter explained. When the slide $a^{13}$ is in its raised position the spring $a^{51}$ for pawl $a^{22}$ engages it with catch $a^{21}$ on slide $a^{13}$ and its valves $a^{17}$ $a^{19}$ are closed, a carrier coming from the line B into the branch $b$ and traveling to the end of the latter compresses the air ahead of it to cause such compressed air to move piston $a^{11}$ in chamber $a^9$ to release the arm $a^{12}$ from plate $a^5$ so that it can drop and the carrier escape, the compression of the air as described by the carrier also diminishes its velocity so that when ready to pass out of the receiver its velocity is practically nothing and it drops from the end of pipe $b$. The plate $a^5$ is weighted or otherwise constructed to automatically return to its normal position and the piston $a^{11}$ is returned to its normal or locking position with the plate $a^5$ by a spring or other suitable device as shown in Fig. 2. The plate $a^5$ or its weight is included in a circuit or forms one terminal or contact $a^{23}$ thereof and is adapted when the valve drops or opens to break contact with another terminal $a^{24}$ as and for a purpose hereinafter described. Each device A′ is also provided with an escape valve I shown more plainly in Figs. 22 to 25 inclusive and it comprises a casing $i$ projecting from the pipe $b$ and communicating therewith said casing having at its outer end a pivoted closing plate forming the valve I which has an arm $i'$ engaging with the armature lever $i^2$ of an electro magnet $i^3$ secured to said casing and in circuit connection with the central office as hereinafter described. When said magnet attracts its armature the valve I is released and this is done as hereinafter set forth when a carrier is sent to the subscriber's station from the central office, and when the armature lever of said magnet is not attracted said lever automatically engages with said valve I or its arm $i'$ to close the same.

The receiver E for the central station, is merely provided with a pivoted plate or valve $e$ and a skeleton box $e'$; said valve having if desired a flexible seat or surface for more effectually sealing the end of its receiving pipe. Said valve $e$ is weighted or otherwise constructed to automatically return to its normal position, see more plainly Fig. 19, and it has an insulated arm $e^2$ with two projections $e^3$ and $e^4$ for contact with electrical circuit terminals or switches $e^6$ and $e^5$ respectively when said valve closes or returns to its normal position, as to be hereinafter explained.

The central office transmitter E′ may be of any suitable construction but I prefer to use the form of the same as shown and described in my said other pending application.

The carrier diverting switches D are inclosed in suitable couplings or boxes joining the line B and branch tubes $b$, see more plainly Figs. 26 to 33 inclusive, wherein the switch is pivoted at $d$ so that its end $d'$ will swing across the path of the tube as shown in dotted lines Fig. 26, and across the inlet of the branch pipes as shown in full lines in said figure. The tail piece $d^2$ of the switch lever D has a slot $d^3$, see more plainly Fig. 28, which engages with a pin on another lever $d^4$ pivoted at or on the switch pintle $d$ and having a movement independent of the switch lever D when free to do so. Said lever $d^4$ has a side pin $d^5$ against which impinges another pivoted lever $d^6$ which if desired may be loosely pivoted on the pintle $d^7$ for the armature lever $d^8$ for the magnets $d^9$, see more plainly Figs. 30 to 32. The armature lever $d^8$ and the lever $d^6$ have a spring connection $d^{10}$ as shown.

$d^{11}$ is another lever pivoted at $d^{12}$ and its forward end engages with the tail piece $d^2$ of switch D in any suitable manner or as shown, and the tail piece $d^{13}$ of lever $d^{11}$ is so arranged that it will move into and out of the branch pipe $b$ when caused to do so as hereinafter explained. The switch lever D is controlled through the medium of the magnets $d^9$ $d^9$ from the central station; and when in the position indicated by full lines in Fig. 26, the switch is locked in position by the armature lever $d^8$ and the switch is across the inlet end of the branch tubes to provide a free passage of the carriers through the tube B. In this position the tail piece $d^{13}$ of lever $d^{11}$ projects into the path of the branch tubes $b$, and a carrier passing out of said branch tubes into the tube B must first strike said tail piece $d^{13}$ of lever $d^{11}$ to depress its outer end and in doing so said lever also depresses the tail piece $d^2$ of switch D to raise it to the position indicated in dotted lines Fig. 26, or across the path of tube B to divert the carrier from the branch $b$ to said tube B. Such described movement of the switch is effected independently of the locking lever $d^8$ owing to the slot $d^3$ in the tail piece of switch D and when the carrier passes by the switch the lever $d^{11}$ returns the switch to its former position or that shown in full lines Fig. 26. The switch D therefore is always or normally locked by the armature lever $d^8$ of magnets $d^9$ to keep the line B open, but such locking does not interfere with a carrier passing out of a branch line actuating the switch without affecting the position of the locking levers for the switch in order that the said carrier may be properly diverted from the branch tube $b$ to the line B.

The cut off valve F for the central station receiver is shown more plainly in Figs. 15 to 18, and consists of a pivoted skeleton or grating valve adapted to be thrown into the path of the tube B as shown in dotted lines in Fig. 15, to find its seat against the walls of the tube B to seal the edges of the valve and said walls. Secured to the valve opposite its openings and in front of the same is a plate $f$ sliding on guides $f'$ having heads $f^2$ between which and the plate $f$ and surrounding the guides are spiral springs which act when free to do so, to move the plate to the valve and seal its openings. The normal position of the valve F is as shown in full lines Fig. 15, or it is normally out of the bore of tube and its plate $f$ is away from the valve to uncover its openings as and for the purpose hereinafter explained.

The air current or pressure reversing valve G is shown more plainly in Figs. 13 and 14, and it consists of a tubular body having perforations $g$ in two series one on each side of a partition $g'$ in a casing $g^2$ to which the pipes $b$ $b^2$ $b^3$ are connected as shown. The valve G has its seat in a corresponding chamber $g^3$ in said casing and has corresponding perforations $g$ on each side of the partition $g'$ so that whenever said valve is moved it will alternately come into position to have one set of its perforations register with one set in the chamber $g^3$ while the other set of perforations in the valve and in the chamber are out of registration, so that one side or other of the valve will be always open to the pump or like device. As shown in Fig. 13, the valve G is open to the suction side of the pump. The movements of valve G are controlled by means of magnets $g^5$ and $g^6$ and a common armature lever $g^7$ for said magnets which have circuit connections and are operated as hereinafter explained.

The operator's electric keys H H' H² H³ for each subscriber's station at the central station are more plainly shown in detail in Figs. 38 and 40, and consist each of a pivoted key having contacts $h$ and $h'$ at one end which are normally opened or out of contact and contacts $h^2$ and $h^3$ at the opposite end which are normally closed see Fig. 40, the contact $h^3$ consisting of a spring so that when released or broken from contact $h^2$ it will close upon contact $h^4$. Each key contact has, or is connected to, a local battery $h^5$ suitably grounded so that each of the keys H, H', H², H³, has its own local battery $h^5$, as shown in Fig. 1. The contacts $h^3$ of each said keys are in multiple arc relation with one side $x$ of a battery or circuit $h^6$ and the contacts $h^4$ of said keys are in like relation with the other side $x'$ of said battery circuit which also includes an electro magnet $h^7$ of preferably high resistance and a contact $k$ of a current reversing switch K for the magnets $g^5$ and $g^6$ controlling the movements of valve G. Each one of the keys H, H', H², and H³, has a wire $x^5$, $x^4$, $x^3$, $x^2$ respectively leading to the magnets $d^9$ for the carrier diverting switches D, and from said magnets $d^9$ to the magnets $i^3$ for valves I and the contacts $a^{23}$ $a^{24}$ for the plate of the combined receiver and transmitters A' at the subscribers' stations as plainly shown in Fig. 1 so that a separate circuit is provided for the electrical appliances at each subscriber's station and the respective appliances therefor at the central office.

The current reversing switch K may be of any suitable kind. In the drawings, particularly Figs. 34, 35 and 36, the switch is shown as comprising contacts $k$, $k'$, which are normally open, the said contact $k'$ being mounted on an armature; a contact $k^2$ which is normally in engagement with a contact $k^5$ which is insulated from its support; a contact $k^3$ insulated from its support and adapted to be engaged by the contact $k^2$ when said contact $k^2$ is forced upward by the operation of the armature co-acting with an electro-magnet $h^7$, and which carries an adjusting screw $k^4$. Of course when the contacts $k^2$ $k^3$ are in engagement the contact $k^2$ is out of engagement with $k^5$. These contacts, the magnets $g^5$ and $g^6$ for the valve G and the contacts $e^5$ $e^6$ $e^7$ $e^8$ (Fig. 19) for the plate or valve $e$ of the central office receiver E are in divided circuits $z$—$z$ and $z'$—$z'$ of a battery $m$ as plainly shown in Fig. 1 and in dotted lines joining Figs. 36, 37, 38 and 39.

Said circuit connections as shown are set to open the valve G to the suction side of the pump which is their normal position as the sub-line B is normally filled or provided with suction currents or has vacuum pressure.

The general operation is as follows: The valves or plates $a^5$ of the devices A' at the subscribers' stations being normally closed as shown in Fig. 2, the cut-off valve F being normally open as indicated in full lines Fig. 15, the reversing valve G being set to the suction side of the pump and the escape valves I at the subscribers' stations being closed and the carrier diverting switches D being in their normal positions as indicated in full lines Fig. 26, a suction or vacuum is formed in line B. To send a carrier from the subscriber's station all that is necessary is to move a sleeve $a'$ at the subscriber's station desired. As the sleeve $a'$ is moved the pivot lever $a^{22}$ is oscillated or moved out of engagement with the catch $a^{21}$ on tubular slide in chamber $a^{10}$ which slide $a^{13}$ drops opening its valve $a^{19}$ and the vacuum in pipe $b$ opens the slide valve $a^{17}$ to put the pipe $b$ in communication with the atmosphere whereat the carrier previously inserted through the opening of pipe into the latter is at once subject to the pressure or current in said pipe $b$ and is propelled by the same through the pipe $b$ to the main line. The opening of the sleeve $a'$ the dropping of the slide $a^{13}$ and the opening of its valves $a^{19}$ $a^{17}$, the insertion of the carrier into pipe $b$ and the closing of sleeve $a$ are almost instantly performed in practice; so quickly do they occur that as soon as the carrier is brought in line with the opening $a$ in pipe $b$ the suction therein draws the carrier from the hand of the subscriber and it is sent through the pipe, whereupon the sleeve $a'$ is closed. When the carrier as it travels in the pipe meets the tail piece $d^{13}$ of lever $d^{11}$ it moves the latter to cause it to throw the switch across the path of tube B to divert the carrier into said tube and such switch is so moved without affecting the locking mechanism for the switch as hereinbefore described. When the carrier arrives at the receiver E at the central station said carrier strikes the valve $e$ thereof to open the same and as the latter opens its projection $e^3$ leaves the contacts $e^6$ and $e^8$ which open and its projection $e^4$ leaves the contact $e^5$ which closes against contact $e^7$ to complete the circuit of battery $m$ through magnet $g^6$ which actuates the armature lever $g^7$ to throw the valve G open to the pressure side of the pump and cut it out or close it to the suction side of the same, the magnet $g^5$ being previously made inactive by the opening of its battery circuit $z$—$z$ by the opening of the contacts $e^6$ and $e^8$ as the valve $e$ dropped or was opened by the carrier. As soon as the reversing valve G is opened to the pressure side of the pump the pressure from the latter passing through pipe $b$ in the direction the opposite of that indicated by the arrows in Fig. 15, first presses the plate $f$ against the valve F and moves both the plate and the valve together to the position shown in dotted lines Fig. 15 to seal the receiver end of the pipe B at the central station so that such pressure cannot escape thereat but is directed by valve F into the line to travel through the same to the subscriber's station from which the carrier was sent as above described, and such pressure passing into chamber $a^{10}$ thereat closes the valve $a^{17}$ in slide $a^{13}$ and then raises the slide $a^{13}$ to its normal position. All of these operations are so quickly performed that they take place before the central office receiver valve $e$ returns to its normal position after being opened by the carrier, so that when it does return to such position its projection $e^4$ opens the contacts $e^5 e^7$ to open the circuit of the magnets $g^6$ and its projection $e^3$ closes the contacts $e^6 e^8$ to close the circuit of the magnets $g^5$ which actuates the armature lever $g^7$ to throw the valve G to the suction side of the pump, whereupon the cut-off valve F is by such suction returned to its normal position to place the tube B in its normal condition. All of said operations take place whenever a carrier is sent from any subscriber's station to the central office, so that when the tube B is normal any number of carriers can be sent from different stations to the central station as desired. To send a carrier from the central station to a subscriber's station, the key H for that station is depressed by the operator which closes contacts $h\ h'$ to throw the local battery for said key and subscriber's station into the circuit $x^5$ therefor and opens the contacts $h^2\ h^3$ and closes the contacts $h^3\ h^4$ through said key to close the circuit of battery $h^6$ to energize the reversing current switch magnet $g^6$ to actuate its armature lever $g^7$ to open the circuit of magnet $g^5$ and close the circuit of magnet $g^6$ in order to throw the reversing valve G from the suction to the pressure side of the pump whereupon the cut off valve F is moved to seal the receiver end of pipe B at the central station as before described, and such air pressure travels through pipe B. Meanwhile the action of the local battery $h^5$ has energized the magnets $d^9$ and the magnets $i^3$ in the line at the subscriber's station and the magnets $d^9$ actuate the armature lever $d^8$ to release it from the locking lever $d^5$ for switch D so that lever $d^5$ is free to act to swing the switch D across the path of the tube B to divert a carrier therefrom to the branch of the subscriber's station; and the magnets $i^3$ release the armature lock $i^2$ from the escape valves I. The closing of the circuits of the batteries $h^5$ and $h^6$ at the same time does not affect the magnets $d^9$ and $i^3$ as the magnet $h^7$ in the circuit of battery $h^6$ is of a much higher resistance than that of the magnets $d^9$ and $i^3$ and consequently the latter act to perform their functions independently of the battery $h^6$. A carrier now inserted in the transmitter E at the central office, travels or is propelled by the air pressure in tube B through it and is diverted by the switch D into the receiver end of pipe $b$. As the carrier in passing into the pipe $b$ impinges against the tail piece $d^2$ of the switch D the carrier resets the switch to its normal position and then travels on to compress the air ahead of it in end $a^3$ of pipe $b$ to move the piston $a^{11}$ to release the lock arm $a^{12}$ from the valve $a^5$ which drops and the carrier falls from the system. As the valve $a^5$ drops it breaks or opens the contacts $a^{23}$ and $a^{24}$ and they in turn open the line circuit for said station, whereupon the key H at the central station is retracted by the usual springs employed for that purpose to open contacts $h\ h'$ to cut the local battery out of the line and to also open contacts $h^3\ h^4$ and in turn the circuit of battery $h^6$. The reversing current switch magnet $g^6$ is then retracted to cut the magnet $g^6$ out of the circuit of battery $m$ and place the magnet $g^5$ in the circuit of said battery to change the reversing valve G from the pressure side of the pump to suction or the normal condition of the tube B. Meanwhile the locking of the carrier diverting switch and of the escape valve at the subscribers' stations has been effected as hereinbefore described. When a carrier is sent from the central station to the terminal subscriber's station $C^4$ which is not in a branch from the tube none of the above described operations take place as the carrier does not have to be diverted and hence said station has no carrier diverting switch and in lieu of the electrically controlled escape valve I the flap valve shown in Figs. 20 and 21 is used at such station and all the electrical devices employed at the remaining stations are dispensed with at station $C^4$.

It will be noted from the foregoing that only a single tube is used to send the carriers from the central station to the subscriber's station and from the latter to the former that the carriers are so sent by pressure or suction that the subscribers have nothing to do but to move the sleeve $a$ at their stations to put the carrier into the system, that the carriers are received at their stations without any work or care on their part, and the operation of sending the carriers to their stations is controlled from the central station and that all the parts of the system operated from the central station as well as others actuated by the carriers automatically return to their normal positions.

It is evident that the parts comprising the system may be variously arranged and the construction of the parts and actuating mechanism therefor may be variously arranged without departing from the spirit of the invention and hence I do not limit myself thereto as shown and described.

What I claim is.

1. In a pneumatic dispatch system, the combination of a main line having a main station, a carrier receiving devices for the main station, a carrier transmitting device thereat, a cut-off valve for said receiver end of the main station, an air current or motive power reversing valve connected to opposite sides of the pump or like device, substation carrier diverting switches, a combined carrier receiving and transmitting device with valves, and electrical devices at the substations and main station, substantially as specified.

2. In a pneumatic dispatch tube system the air current or motive power reversing valve G combined with a cut-off valve substantially as specified.

3. In a pneumatic dispatch tube system a combined receiver and transmitter having a normally closed movable sleeve or door which is opened to insert the carrier into the system, a normally closed plate or valve which opens to admit of the exit of a carrier from the system, movable valves and actuating mechanism interposed between said movable valves and sleeve, substantially as specified.

4. In a pneumatic dispatch tube system a sub-station, combined receiver and transmitter for carriers, an escape valve for said receiver and transmitter, and a carrier diverting switch at said stations, substantially as specified.

5. In a pneumatic dispatch tube system the combination of a line of tubing having a central office and a series of sub-stations, carrier transmitting and receiver devices at said stations, carrier diverting switches at the subscribers' stations, air current or motive power reversing valve, an electric current changing switch and operating-keys at the central office, electrical appliances for said reversing valve and for the carrier diverting switches, and electrical connections between said electrical devices, substantially as specified.

6. In a pneumatic dispatch system, a sub or other line having a terminal sub-station, combined receiving and transmitting devices at said terminal, and a separate air escape valve at or on said device, substantially as specified.

In testimony whereof I affix my signature in presence of two witnesses.

HENRY CLAY.

Witnesses:
GEO. R. BYINGTON,
S. J. VAN STAVOREN.